United States Patent
Kim et al.

(10) Patent No.: US 12,008,741 B2
(45) Date of Patent: Jun. 11, 2024

(54) DISPLAY DEVICE AND OPERATION METHOD THEREOF

(71) Applicant: LG ELECTRONICS INC., Seoul (KR)

(72) Inventors: Kyuri Kim, Seoul (KR); Jongmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 191 days.

(21) Appl. No.: 17/627,836

(22) PCT Filed: Jul. 31, 2019

(86) PCT No.: PCT/KR2019/009572
§ 371 (c)(1),
(2) Date: Jan. 18, 2022

(87) PCT Pub. No.: WO2021/020627
PCT Pub. Date: Feb. 4, 2021

(65) Prior Publication Data
US 2022/0277428 A1    Sep. 1, 2022

(51) Int. Cl.
*G06T 5/92* (2024.01)
*G06T 5/40* (2006.01)

(52) U.S. Cl.
CPC .............. *G06T 5/92* (2024.01); *G06T 5/40* (2013.01); *G06T 2207/10024* (2013.01); *G06T 2207/20021* (2013.01); *G06T 2207/20208* (2013.01)

(58) Field of Classification Search
CPC . G06T 5/009; G06T 5/40; G06T 2207/10024; G06T 2207/20021; G06T 2207/20208
See application file for complete search history.

(56) References Cited

U.S. PATENT DOCUMENTS

| | | |
|---|---|---|
| 7,953,286 B2 | 5/2011 | Chiang et al. |
| 10,176,561 B2 * | 1/2019 | Evans .................. H04N 7/147 |
| 2002/0171852 A1 | 11/2002 | Zhang et al. |

(Continued)

FOREIGN PATENT DOCUMENTS

| | | |
|---|---|---|
| EP | 1 761 040 A2 | 3/2007 |
| JP | 2013-30158 A | 2/2013 |

(Continued)

OTHER PUBLICATIONS

International Search Report, issued in PCT/KR2019/009572, dated Apr. 24, 2020.

*Primary Examiner* — Grace Q Li
(74) *Attorney, Agent, or Firm* — Birch, Stewart, Kolasch & Birch, LLP

(57) ABSTRACT

A display device including a display; one or more processors; and a memory storing one or more programs configured to be executed by the one or more processors, the one or more programs including instructions for receiving an input image to be displayed on the display; selecting a look-up table (LUT) curve stored in the memory for the received input image; performing a histogram on the received input image; applying an offset gain to the selected LUT curve based on the histogram to generate an offset LUT curve; performing tone mapping of the input image through the offset LUT curve; and displaying the tone mapped image on the display.

13 Claims, 16 Drawing Sheets

(56) References Cited

U.S. PATENT DOCUMENTS

| | | | | |
|---|---|---|---|---|
| 2005/0031201 A1* | 2/2005 | Goh | ............... | G06T 5/009 |
| | | | | 382/254 |
| 2011/0292246 A1* | 12/2011 | Brunner | ............... | G06T 5/009 |
| | | | | 382/167 |
| 2019/0265552 A1* | 8/2019 | Shiomi | ............... | G02F 1/133609 |
| 2022/0277812 A1* | 9/2022 | Kim | ............... | G16H 50/70 |

FOREIGN PATENT DOCUMENTS

| | | |
|---|---|---|
| JP | 2016-4313 A | 1/2016 |
| KR | 10-2007-0026190 A | 3/2007 |
| KR | 10-2011-0064631 A | 6/2011 |

\* cited by examiner

FIG. 12A
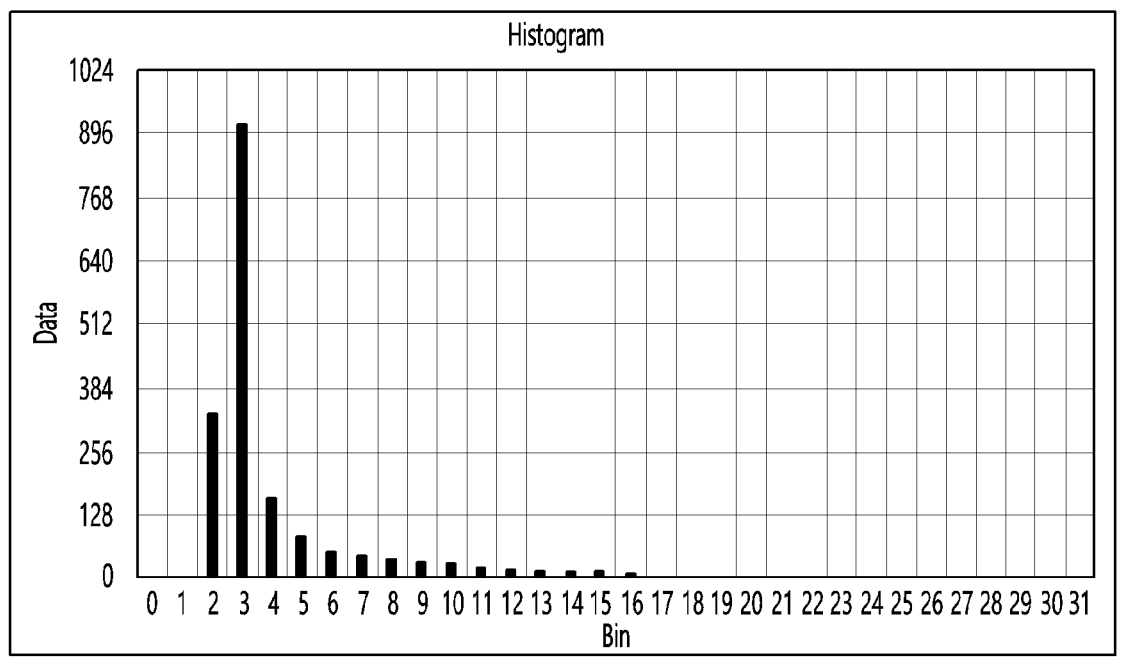
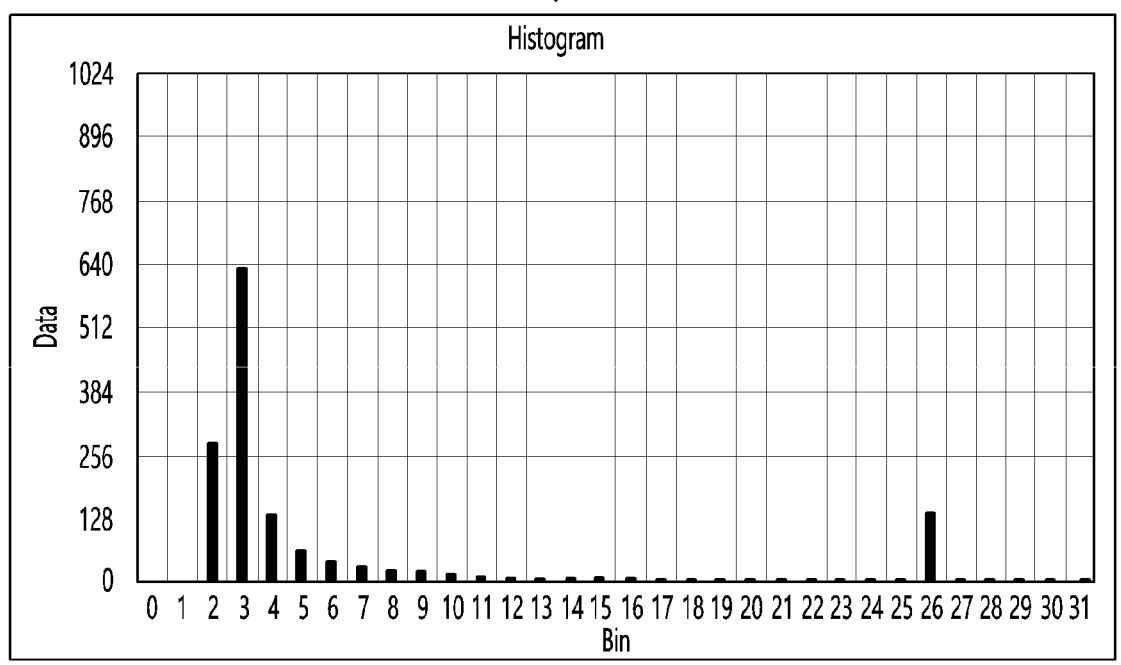

FIG. 13A
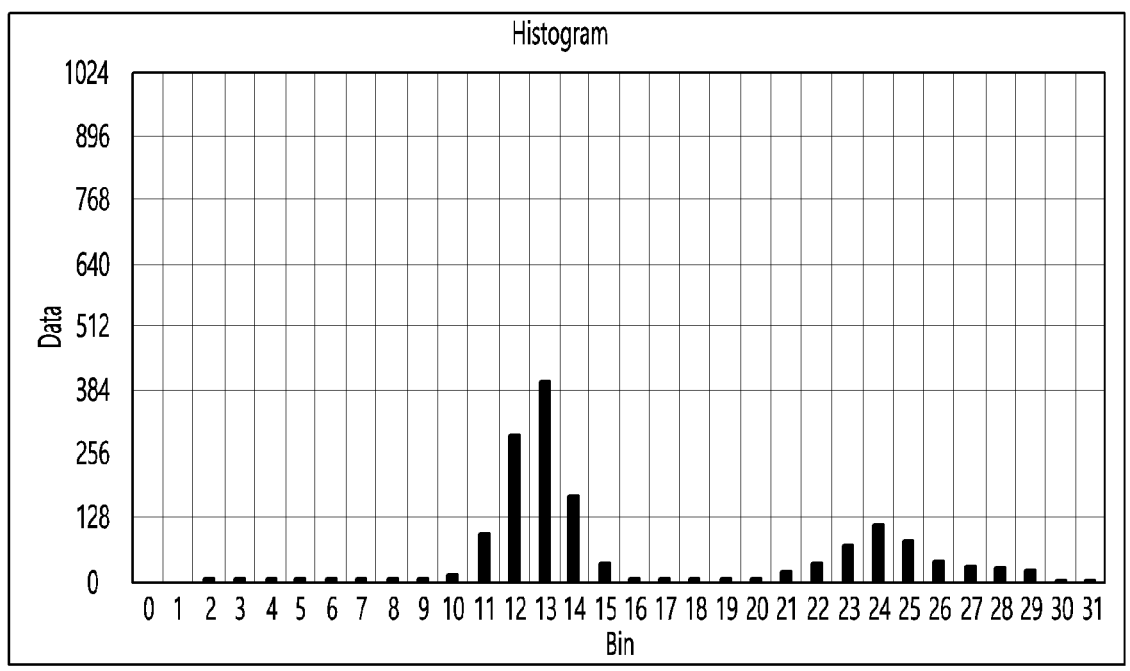
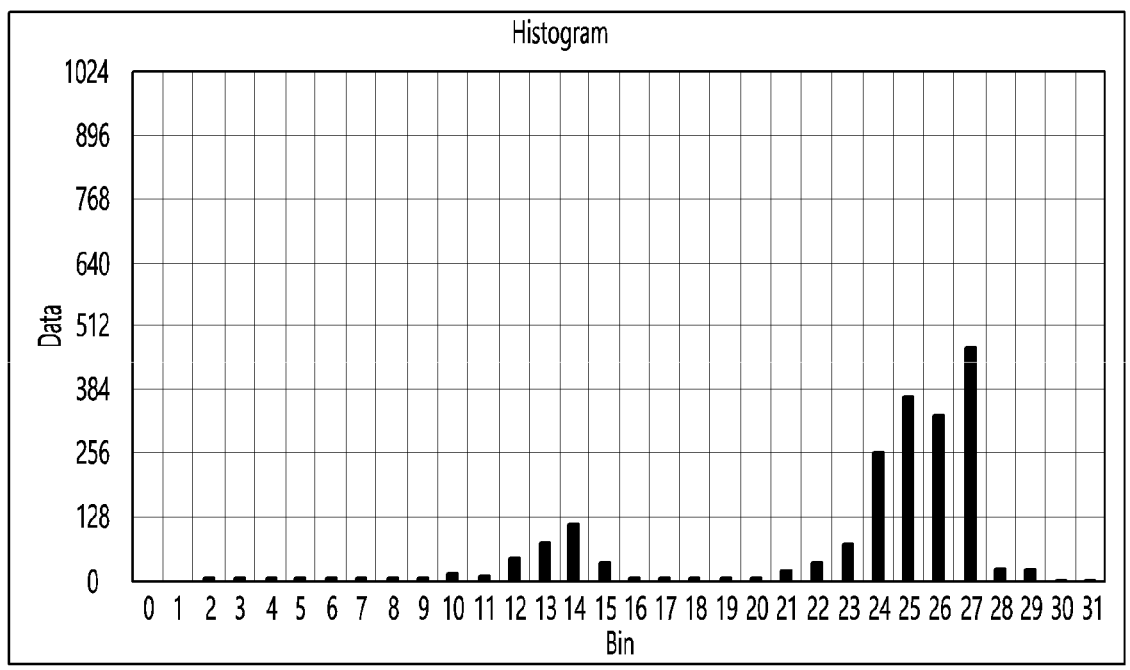

DISPLAY DEVICE AND OPERATION METHOD THEREOF

CROSS-REFERENCE TO RELATED APPLICATION

This application is the National Phase of PCT International Application No. PCT/KR2019/009572, filed on Jul. 31, 2019, which is hereby expressly incorporated by reference into the present application.

BACKGROUND OF THE INVENTION

Field of the Invention

The present disclosure relates to a display device and an operation method thereof, and more particularly to a display device and an operation method thereof for improving the color and contrast of an image.

Discussion of the Related Art

A dynamic range (DR) refers to a range from the brightest to the darkest. As the dynamic range is increased, a user is capable of feeling as he or she is actually seeing an environment in an image.

Recently, a standard dynamic range (SDR) has been mainly used for an image source input to a display device, and in this regard, has a limit in realizing realistic image quality in that a range of brightness is narrower than a range seen by the human eye.

To overcome the limit, a tone mapping algorithm for improving the color or contrast of an image is used. However, the tone mapping algorithm currently uses a static curve, and thus there is a problem in that a contrast ratio is lowered or saturated in some images.

Accordingly, there is a need for a method of improving color or contrast irrespective of the characteristics of an image.

SUMMARY OF THE INVENTION

The present disclosure provides a display device and an operation method thereof for improving the color or contrast of all input images.

The present disclosure provides a display device and an operation method thereof for improving the color or contrast irrespective of the characteristics of an image.

A display device and an operation method thereof according to an embodiment of the present disclosure may perform tone mapping for applying a curve in various ways depending on the characteristics of an image.

A display device according to an embodiment of the present disclosure comprises a controller configured to perform tone mapping for converting RGB data of an input image through a look-up table (LUT) curve, and a display configured to display an image based on the RGB data converted by the tone mapping, wherein the controller corrects the LUT curve according to a histogram of the input image.

The controller acquires an offset gain based on the histogram of the input image and corrects the LUT curve by applying the offset gain.

The controller acquires a max bin with concentrated data in the histogram of the input image and acquires the offset gain based on the max bin.

The controller acquires a representative bin of a group with a high ratio of data based on the histogram of the input image and acquires the offset gain based on the max bin and the representative bin.

When the max bin belongs to the group with a high ratio of data, the controller acquires a gain value corresponding to the max bin as the offset gain.

When the max bin does not belong to the group with a high ratio of data, the controller acquires a gain value corresponding to an average of the max bin and the representative bin as the offset gain.

The controller acquires the group with a high ratio of data based on a bin with an amount of data equal to or greater than a predetermined ratio in the histogram of the input image.

The controller acquires an offset point based on at least one of the max bin or the representative bin and acquires a gain value mapped to the offset point as the offset gain, and wherein a higher gain value is mapped as the gain value is increased.

When data corresponding to 50% or more in the histogram of the input image belongs to a range corresponding to an upper first setting ratio, the controller acquires the offset gain as 0.

When data corresponding to the top 50% or more in the histogram of the input image belongs to a range corresponding to an upper second setting ratio, the controller differently acquires the offset gain depending on an amount of data belonging to a range corresponding to the upper second setting ratio.

The controller acquires the offset gain by multiplying a gain value mapped to an offset point by a specified constant depending on an amount of data belonging to the range of the upper second setting ratio.

The controller acquires an LUT curve obtained by compensating for luminance based on a reduced value of max luminance when the offset gain is applied.

The controller selects any one of a plurality of predetermined LUT curves based on a peak luminance level or an average picture level (APL) of the input image and corrects the selected LUT curve according to the histogram of the input image.

The controller acquires an offset gain based on the histogram of the input image and corrects the LUT curve by applying the offset gain to the selected LUT curve.

An operation method of a display device according to an embodiment of present disclosure comprises storing a plurality of look-up table (LUT) curves, selecting any one of the plurality of LUT curves, correcting the LUT curve selected among the plurality of LUT curves according to a histogram of an input image, performing tone mapping for converting RGB data of an input image using an LUT curve corrected according to the histogram of the input image, and displaying an image on which the tone mapping is performed.

Advantageous Effects

According to an embodiment of the present disclosure, the color or contrast may be enhanced for all input images by applying different look-up table (LUT) curves to tone mapping when the characteristics of an image are different.

BRIEF DESCRIPTION OF THE DRAWINGS

FIGS. 12A and 12B are example diagrams for explaining a method of differently outputting an LUT curve according to a peak of an input image by a display device according to an embodiment of the present disclosure.

FIGS. 13A and 13B are example diagrams for explaining a method of differently outputting an LUT curve according to distribution of a histogram of an input image by a display device according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
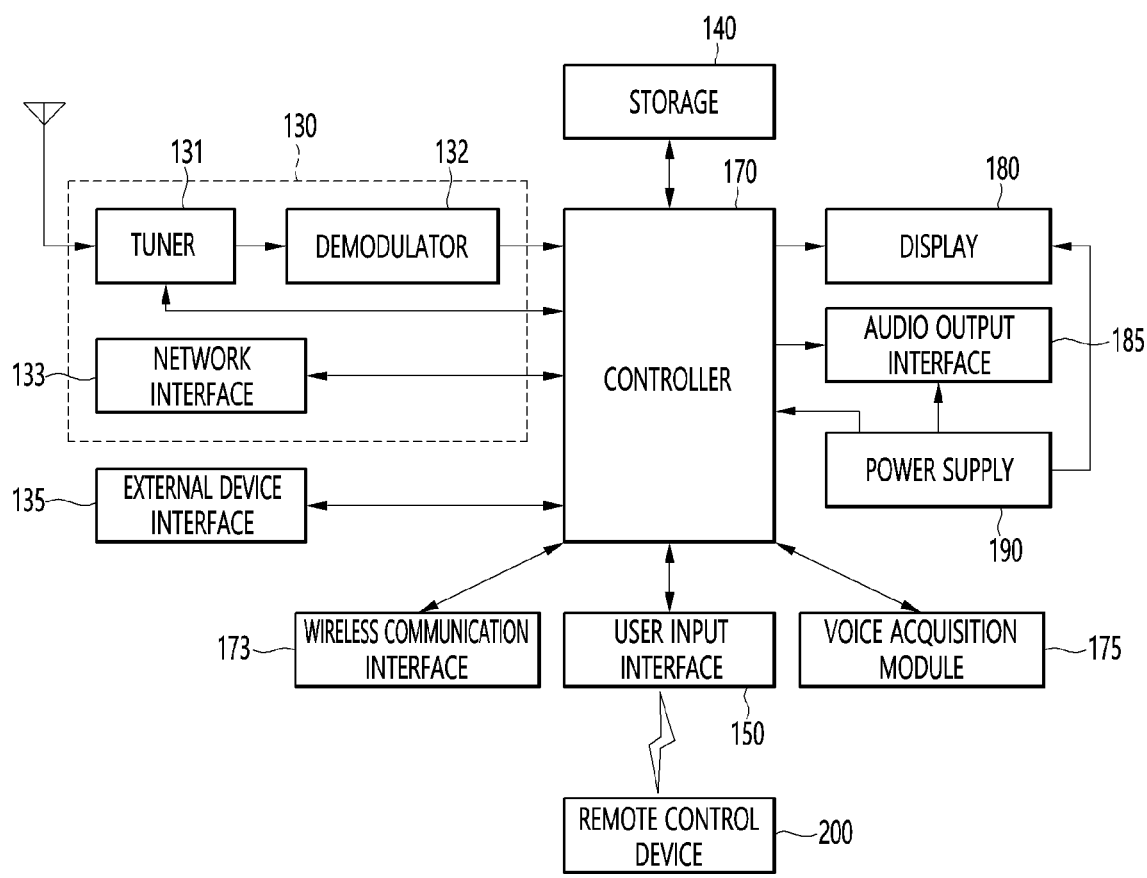
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception module 130, an external device interface 135, a storage 140, a user input interface 150, a controller 170, a wireless communication interface 173, a voice acquisition module 175, a display 180, an audio output interface 185, and a power supply 190.

The broadcast reception module 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The voice acquisition module 175 can acquire audio. The voice acquisition module 175 may include at least one microphone (not shown), and can acquire audio around the display device 100 through the microphone (not shown).

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present disclosure described below can be performed by one of the display device described with reference to FIG. 1, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a DC/DC converter for converting a level of the DC source power.

Figure 2:
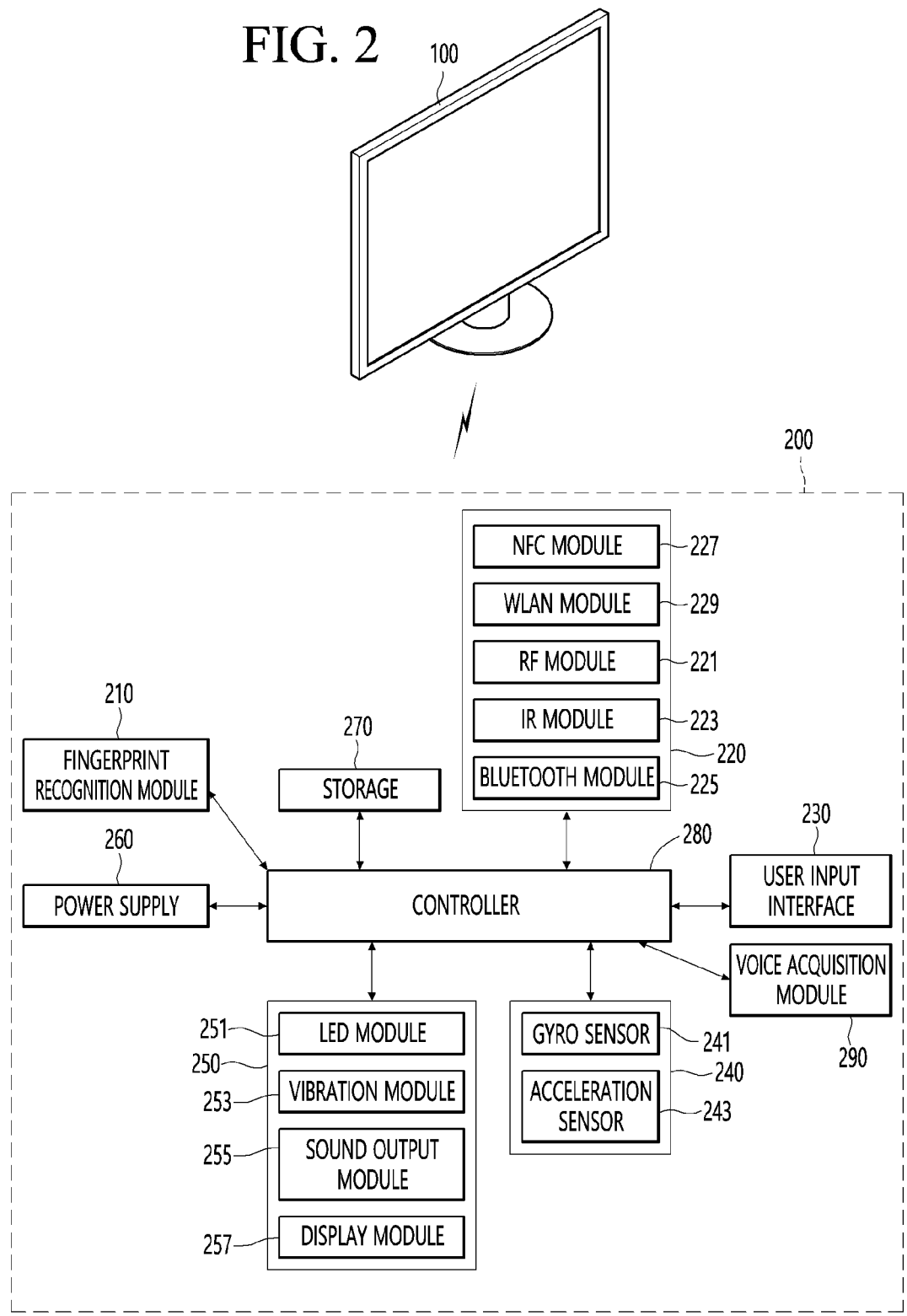
FIG. 2 is a block diagram of a remote control device according to an embodiment of the present disclosure.
Figure 3:
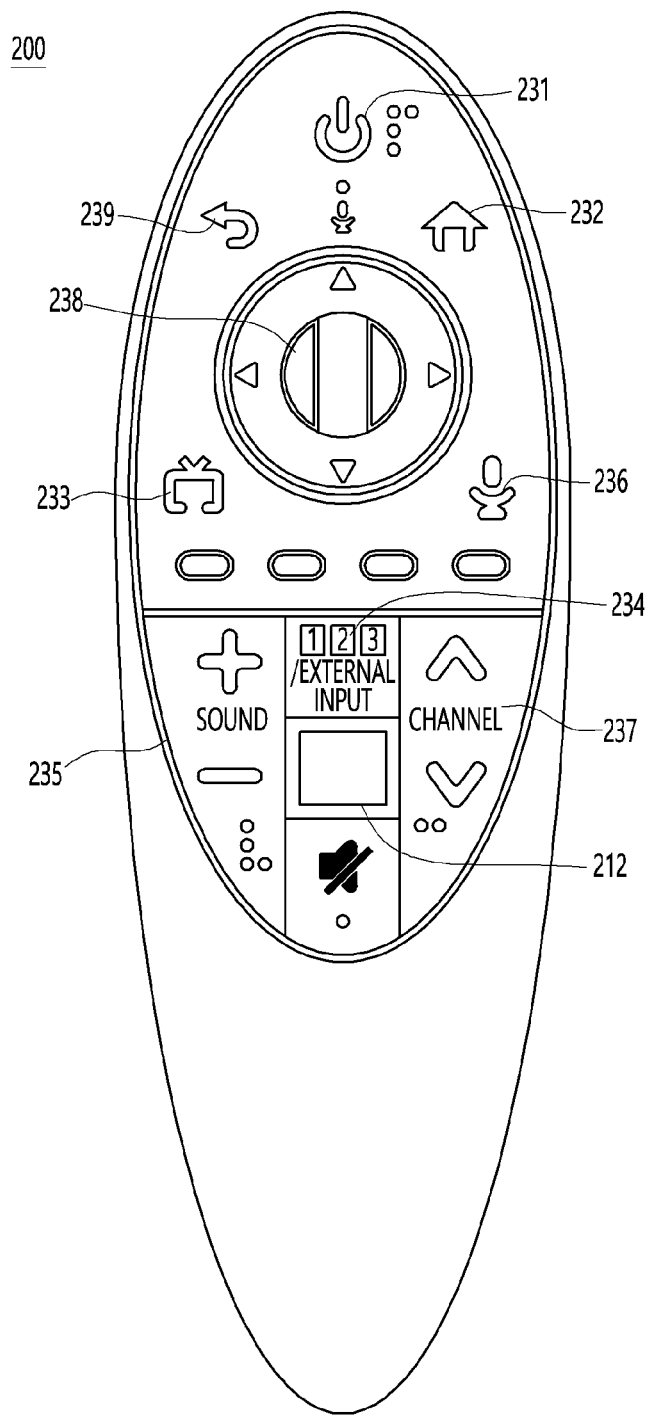
FIG. 3 shows an example of an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition module 210, a wireless communication interface 220, a user input interface 230, a sensor 240, an output interface 250, a power supply 260, a storage 270, a controller 280, and a voice acquisition module 290.

Referring to FIG. 2, the wireless communication interface 220 transmits/receives signals to/from an arbitrary any one of display devices according to the above-mentioned embodiments of the present disclosure.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication interface 220.

Moreover, the remote control device 200 can receive signals transmitted from the display device 100 through the RF module 221 and if necessary, can transmit a command on power on/off, channel change, and volume change to the display device 100 through the IR module 223.

The user input interface 230 can be configured with a keypad button, a touch pad, or a touch screen. A user can manipulate the user input interface 230 to input a command relating to the display device 100 to the remote control device 200. If the user input interface 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The power button 231 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume outputted from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input interface 230 includes a touch screen, a user can touch a soft key of the touch screen to input a command relating to the display device 100 to the remote control device 200. Additionally, the user input interface 230 can include various kinds of input means manipulated by a user, for example, a scroll key and a jog key, and this embodiment does not limit the scope of the present disclosure.

The sensor 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display 180 of the display device 100.

The output interface 250 can output image or voice signals corresponding to a manipulation of the user input interface 230 or corresponding to signals transmitted from the display device 100. A user can recognize whether the user input interface 230 is manipulated or the display device 100 is controlled through the output interface 250.

For example, the output interface 250 can include an LED module 251 for flashing, a vibration module 253 for generating vibration, a sound output module 255 for outputting sound, or a display module 257 for outputting an image, if the user input interface 230 is manipulated or signals are transmitted/received to/from the display device 100 through the wireless communication interface 220.

Additionally, the power supply 260 supplies power to the remote control device 200 and if the remote control device 200 does not move for a predetermined time, stops the power supply, so that power waste can be reduced. The power supply 260 can resume the power supply if a predetermined key provided at the remote control device 200 is manipulated.

The storage 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The controller 280 of the remote control device 200 can store, in the storage 270, information on a frequency band for transmitting/receiving signals to/from the display device 100 paired with the remote control device 200 and refer to it.

The controller 280 controls general matters relating to a control of the remote control device 200. The controller 280 can transmit a signal corresponding to a predetermined key manipulation of the user input interface 230 or a signal corresponding to a movement of the remote control device 200 sensed by the sensor 240 to the display device 100 through the wireless communication interface 220.

Additionally, the voice acquisition module 290 of the remote control device 200 can obtain voice.

The voice acquisition module 290 can include at least one microphone 291 and obtain voice through the microphone 291.

Figure 4:
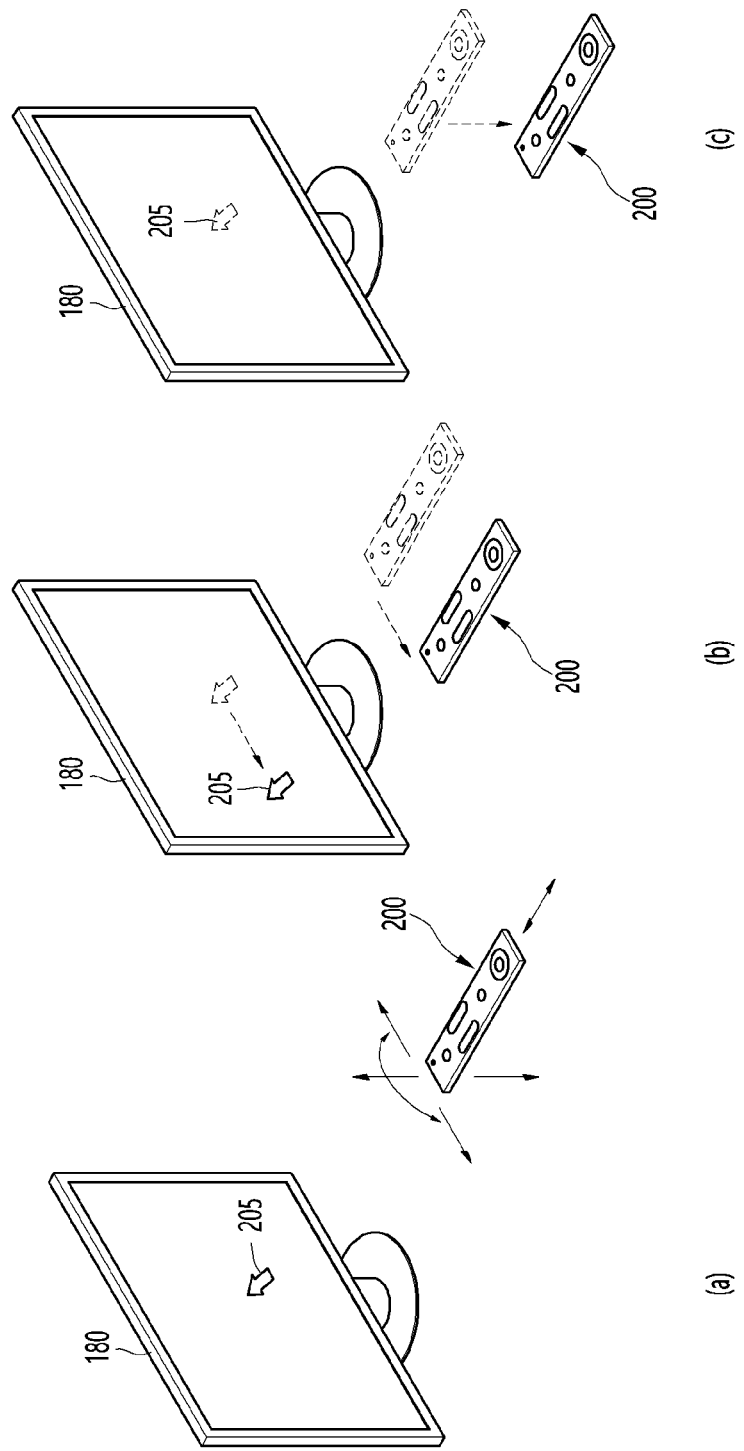
FIG. 4 shows an example of using a remote control device according to an embodiment of the present disclosure.

Then, FIG. 4 is described.

FIG. 4 is a view of utilizing a remote control device according to an embodiment of the present disclosure.

FIG. 4(a) illustrates that a pointer 205 corresponding to the remote control device 200 is displayed on the display 180.

A user can move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4(b) illustrates that if a user moves the remote control device 200, the pointer 205 displayed on the display 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(c) illustrates that while a specific button in the remote control device 200 is pressed, a user moves the remote control device 200 away from the display 180. Thus, a selection area in the display 180 corresponding to the pointer 205 can be zoomed in and displayed largely.

On the other hand, if a user moves the remote control device 200 close to the display 180, a selection area in the display 180 corresponding to the pointer 205 can be zoomed out and displayed reduced.

On the other hand, if the remote control device 200 is away from the display 180, a selection area can be zoomed out and if the remote control device 200 is close to the display 180, a selection area can be zoomed in.

Additionally, if a specific button in the remote control device 200 is pressed, the recognition of a vertical or horizontal movement can be excluded. That is, if the remote control device 200 is moved away from or close to the display 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display 180 and also can be displayed in correspondence to a plurality of points such as a line and a surface.

Figure 5:
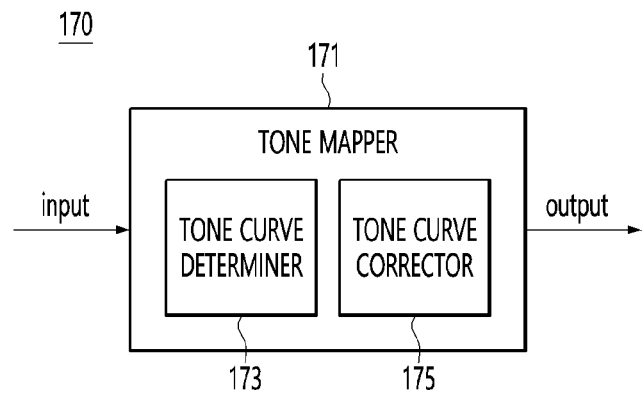
FIG. 5 is a block diagram of a tone mapper according to an embodiment of the present disclosure.

FIG. 5 is a block diagram of a tone mapper according to an embodiment of the present disclosure.

A display device 100 according to an embodiment of the present disclosure may further include a tone mapper 171. In particular, a controller 170 may include the tone mapper 171. However, this is merely exemplary, and the tone mapper 171 may be provided at any position within the display device 100.

The tone mapper 171 may convert RGB data by performing tone mapping for applying a look-up table (LUT) curve to an input image. The display 180 may display an image based on the RGB data converted by tone mapping.

In detail, upon receiving an image, the tone mapper 171 may convert the RGB data of the input image to output the converted data. The display 180 may receive converted RGB data output from the tone mapper 171. The display 180 may display an image based on the converted RGB data.

The tone mapper 171 may include at least some or all of a tone curve determiner 173 and a tone curve corrector 175.

The tone curve determiner 173 may acquire a LUT curve to be used in tone mapping.

The LUT curve may be a table for changing the RGB of a captured original image to a new RGB by adjusting hue, saturation, and brightness.

In detail, the storage 140 may store a plurality of LUT curves, and the tone curve determiner 173 may recognize at least one of a plurality of LUT curves stored in the storage 140 as an LUT curve to be used in tone mapping.

The tone curve determiner 173 may select any one of a plurality of predetermined LUT curves based on at least one of a peak luminance level or an average picture level (APL) of the input image. A method of selecting any one of a plurality of LUT curves will be described with reference to FIG. 7.

The tone curve corrector 175 may correct the LUT curve determined by the tone curve determiner 173. The tone curve corrector 175 may correct the LUT curve selected from the plurality of LUT curves based on a histogram of the input image.

The tone curve corrector 175 may perform tone mapping for converting RGB data of the input image using the corrected LUT curve. The tone curve corrector 175 may output the RGB data converted using the tone mapping.

Figure 6:
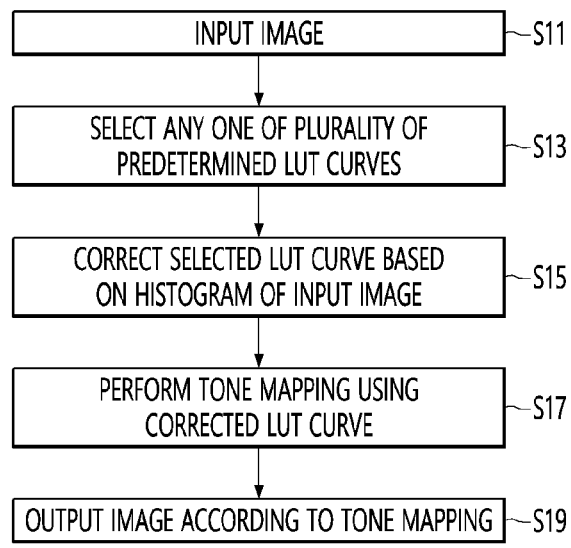
FIG. 6 is a flowchart of an operation method of a display device according to an embodiment of the present disclosure.

FIG. 6 is a flowchart of an operation method of a display device according to an embodiment of the present disclosure.

The controller 170 may receive an image (S11).

The controller 170 may receive the received image through the broadcast reception module 130, the external device interface 135, the user input interface 150, the wireless communication interface 173, etc.

The controller 170 may acquire RGB data of the input image.

The controller 170 may select any one of the plurality of predetermined LUT curves (S13).

The controller 170 may select any one of the plurality of predetermined LUT curves based on the peak luminance level or the average picture level (APL) of the input image.

Figure 7:
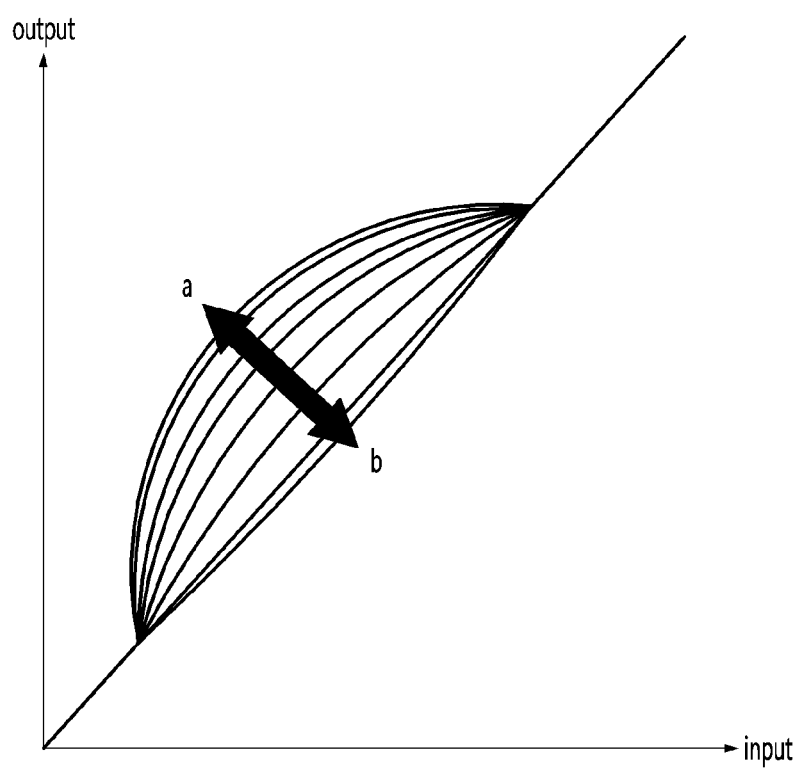
FIG. 7 is an example diagram of a method of selecting any one from a plurality of LUT curves by a display device according to an embodiment of the present disclosure.

FIG. 7 is an example diagram of a method of selecting any one from a plurality of LUT curves by a display device according to an embodiment of the present disclosure.

As shown in FIG. 7, the storage 140 may store the plurality of LUT curves. Referring to FIG. 7, the plurality of LUT curves may have different respective gains for improving color or contrast, and in this regard, the closer the LUT curve to a side "a", the higher an improvement gain of color or contrast, and the closer the LUT curve to a side "b", the lower an improvement gain of color or contrast.

The controller 170 may select any one of the plurality of LUT curves based on image information. For example, the controller 170 may select an LUT curve closer to the side "b" for an image with a higher peak luminance level and APL and may select an LUT curve closer to the side "a" for an image with a lower peak luminance level and APL.

To this end, the controller 170 may pre-store a table to which LUT curves corresponding to peak luminance levels and APLs and may acquire an LUT curve from the table based on the peak luminance level and APL of the input image. However, this is merely exemplary, and the controller 170 may acquire any one of a plurality of LUT curves using various methods.

Again, FIG. 6 is described.

The controller 170 may correct the selected LUT curve based on a histogram of the input image (S15).

The controller 170 may acquire the histogram of the input image based on RGB data of the input image and may correct the selected LUT curve based on the histogram of the input image.

In the case of an image, distribution of luminance levels of which is not uniform, a contrast ratio may be rather lowered or saturated during tone mapping for improving the color or contrast of the image. Thus, according to the present disclosure, for data with concentrated luminance levels, the LUT curve may be further corrected to perform tone mapping by reducing a gain of the LUT curve.

Hereinafter, a method of correcting an LUT curve by a display device according to an embodiment of the present disclosure will be described with reference to FIGS. 8 to 11.

The controller 170 may adjust an LUT curve according to the histogram of the input image.

Figure 8:
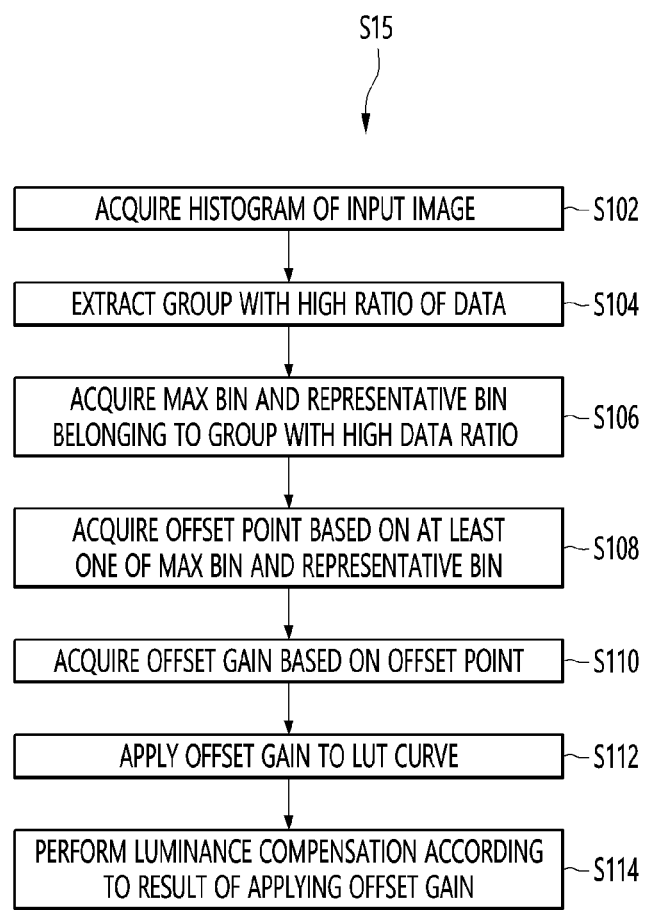
FIG. 8 is a flowchart of a method of correcting an LUT curve by a display device according to an embodiment of the present disclosure.

FIG. 8 is a flowchart of a method of correcting an LUT curve by a display device according to an embodiment of the present disclosure.

FIG. 8 is a flowchart for specifying operation S15 of FIG. 6.

The controller 170 may acquire a histogram of an input image (S107).

The histogram of the input image may be a graph showing distribution of a luminance level of an input image and shows a frequency for each luminance level of the input image.

For example, the controller 170 may group luminance levels of the input image in units of 32 bins. When the luminance levels are grouped in units of 32 bins, an image processing speed may be advantageously improved.

The controller 170 may extract a group with a high ratio of data from the histogram of the input image (S104).

The controller 170 may extract a group with concentrated data from a histogram indicated in units of bins. The controller 170 may recognize six consecutive bins as one group and may extract a group with the highest data frequency among the recognized groups as a group with a higher data ratio.

That is, the controller 170 may obtain a group with a high data ratio based on a bin with the amount of data equal to or greater than a predetermined ratio in the histogram of the input image.

In some embodiments, when recognizing six consecutive bins as one group, the controller 170 may recognize corresponding bins as one group only when a ratio of data occupied by each of six bins is equal to or greater than 5%. In this case, a ratio of data may not be extracted for a group having bins less than 5%, and thus unnecessary calculation may be advantageously minimized.

The controller 170 may acquire the max bin and a representative bin belonging to a group with a high ratio of data (S106).

The max bin may refer to a bin with the highest frequency among 32 bins. That is, the max bin may be a bin with concentrated data in the histogram of the input image.

For example, the controller 170 may acquire a bin with the highest frequency as the max bin in the histogram.

The representative bin may be any one bin belonging to a group with a high ratio of data. For example, the representative bin may be the first bin of the group with a high data ratio.

The controller 170 may acquire an offset point based on at least one of the max bin or the representative bin (S108).

The offset point may refer to a bin having data corresponding to a region, a contrast ratio of which is supposed to be further lowered via tone mapping.

A region in which data is concentrated is different for each image, and thus the controller 170 may obtain an offset point in order to differently apply the offset gain depending on a region in which data is concentrated.

Hereinafter, a method of acquiring an offset point by a display device according to an embodiment of the present disclosure will be described with reference to FIG. 9.

Figure 9:
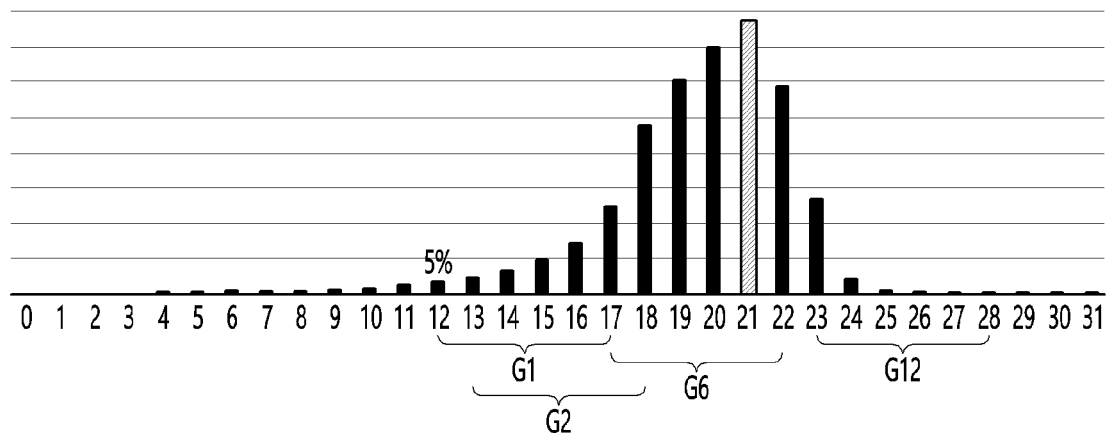
FIG. 9 is an example diagram for explaining a method of acquiring an offset point based on a histogram of an input image by a display device according to an embodiment of the present disclosure.

FIG. 9 is an example diagram for explaining a method of acquiring an offset point based on a histogram of an input image by a display device according to an embodiment of the present disclosure.

Referring to an example of FIG. 9, the controller 170 may acquire groups G1 to G12 with six consecutive bins having the amount of data of at least 5% of the total. The controller 170 may extract a group with a high data ratio by calculating a ratio of data belonging to each group based on the total for each of the plurality of groups G1 to G12. In the example of FIG. 9, a sixth group G6 of the plurality of groups G1 to G12 may be a group with a high data ratio.

The controller 170 may acquire a representative bin in the group with a high data ratio. For example, when the representative bin is a first bin of the group with a high data ratio, the representative bin may be a bin #17 in the example of FIG. 9.

The controller 170 may acquire the max bin, and in the example of FIG. 9, the max bin may be a bin #21.

Upon acquiring the representative bin and the max bin, the controller 170 may acquire an offset point based on the representative bin and the max bin.

To acquire the offset point, the controller 170 may determine whether the max bin belongs to the group with a high data ratio. In the example of FIG. 9, the controller 170 may determine whether a bin #21 as the max bin corresponds to any one of bins #17 to #22 as the group G6 with a high data ratio.

When the max bin belongs to the group with a high data ratio, the controller 170 may acquire the max bin as an offset point. In the example of FIG. 9, the controller 170 may acquire a bin #21 as an offset point.

When the max bin does not belong to the group with a high data ratio, the controller 170 may acquire a bin corresponding to an average of the max bin and the representative bin as an offset point. Differently from the example of FIG. 9, when the max bin is a bin #23 and the representative bin is a bin #17, a bin #20 as an average of bins #23 and #17 as an offset point. That is, when the max bin does not belong to the group with a high ratio, the controller 170 may acquire the average of the max bin and the representative bin as an offset point.

The controller 170 may acquire an offset gain based on the offset point (S110).

The controller 170 may map a gain value to each bin as an offset point. Thus, upon acquiring the offset point, the controller 170 may extract the gain value mapped to the offset point and may acquire the extracted gain value as an offset gain. That is, the controller 170 may acquire the gain value mapped to the offset point as the offset gain. In this case, a higher gain value may be mapped as the offset point is increased.

According to an embodiment of the present disclosure, the controller 170 may acquire the max bin with concentrated data in the histogram of the input image and may acquire the offset gain based on the max bin.

According to another embodiment, the controller 170 may acquire the offset gain based on the max bin and the representative bin.

For example, when the max bin belongs to the group with a high data ratio, the controller 170 may acquire a gain value corresponding to the max bin as the offset gain. In another example, when the max bin does not belong to the group with a high data ratio, the controller 170 may acquire a gain value corresponding to an average of the max bin and the representative bin as the offset gain.

For example, when the input image is a 10-bit image, the offset gain may be any one of 0 to 80.

When acquiring the offset gain, the controller 170 may adjust the offset gain depending on distribution and amount of data corresponding to the top 50% or more in the histogram of the input image.

Hereinafter, a method of adjusting an offset gain according to distribution of data corresponding to the top 50% or more in the histogram of the input image by the controller 170 will be described.

According to an embodiment, when data corresponding to 50% or more in the histogram of the input image belongs to a range corresponding to an upper first setting ratio, the controller 170 may acquire an offset gain as 0. For example, the first setting ratio may be 3%. That is, when more than half of the data of the input image belongs to the top 3%, the controller 170 may recognize that the image corresponds to an overall bright image, and in this case, data may not be concentrated at a specific luminance level, and thus the controller 170 may acquire the offset gain as 0.

Hereinafter, a method of adjusting an offset gain depending on the amount of data corresponding to the top 50% or more in a histogram of an input image by the controller 170 will be described.

According to an embodiment, when data corresponding to the top 50% or more in the histogram of the input image belongs to a range corresponding to an upper second setting ratio, the controller 170 may differently acquire an offset gain depending on the amount of data belonging to the range corresponding to the upper second setting ratio. For example, the second setting ratio may be 50%.

Figure 10:
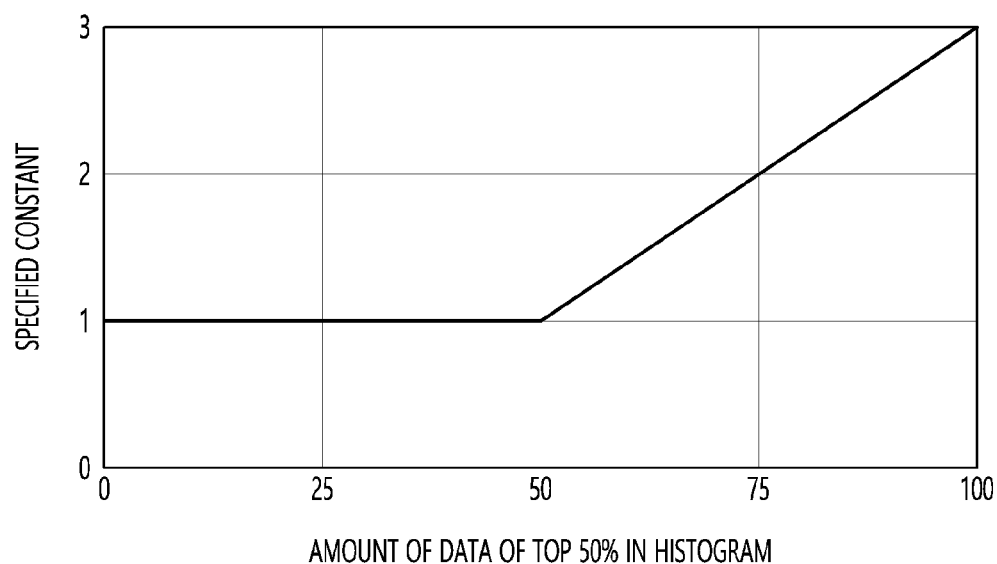
FIG. 10 is an example diagram for explaining a method of setting an offset gain depending on the amount of data by a display device according to an embodiment of the present disclosure.

FIG. 10 is an example diagram for explaining a method of setting an offset gain depending on the amount of data by a display device according to an embodiment of the present disclosure.

When data corresponding to the top 50% or more in the histogram of the input image is concentrated in the top 50%, the controller 170 may acquire a gain obtained by multiplying a gain value by a specified constant as an offset gain.

Referring to FIG. 10, when the amount of data of the top 50% in the histogram of the input image, the controller 170 may set the specified constant to 1, and in this case, the offset gain may be a gain value corresponding to the offset point.

When the amount of data of the top 50% in the histogram of the input image is 75%, the controller 170 may set the specified constant to 2. That is, when the amount of data belonging to a range corresponding to the top 50% is 70% of the total data, the controller 170 may set the specified constant to 2. In this case, the controller 170 may acquire a value obtained by multiplying a gain value corresponding to an offset point by 2 as the offset gain.

When the amount of data of the top 50% in the histogram of the input image is 100%, the controller 170 may set the specified constant to 3. That is, when the amount of data belonging to a range corresponding to the top 50% is 100% of the total data, the controller 170 may set the specified constant to 3. In this case, a value obtained by multiplying a gain value corresponding to the offset point by 3 may be acquired as an offset gain.

That is, the controller 170 may adjust a gain value to be increased as the amount of data belonging to the top 50% of data of the input image is increased.

When the amount of data of the top 50% is greater than 50% and less than 75% and is greater than 70% and less than 100%, the controller 170 may acquire a specified constant and may adjust an offset gain according to a graph shown in FIG. 10, similarly to the above description.

When any one of 0 to 80 is set to an offset gain depending on an offset point, the controller 170 may adjust the offset gain to any one of 0 to 240 depending on the amount of data of the top 50%.

The controller 170 may apply the offset gain to an LUT curve (S112).

The controller 170 may apply the offset gain to an LUT curve via calculation of subtracting the offset gain from the LUT curve selected from a plurality of LUT curves. That is, when the offset gain is applied to the LUT curve, this may mean that a curve obtained by subtracting the offset gain from the LUT curve is acquired.

In short, the controller 170 may acquire the offset gain based on the histogram of the input image and may correct the LUT curve by applying the offset gain.

The controller 170 may perform luminance compensation according to the result of applying the offset gain (S114).

The controller 170 may or may not perform luminance compensation according to the result of applying the offset gain. That is, the controller 170 may analyze the result of applying the offset gain and may perform luminance compensation only when luminance compensation is required.

As such, the controller 170 may acquire the LUT curve corrected by applying the offset gain to the LUT curve or may apply the offset gain to the LUT curve and may then acquire the corrected LUT curve through luminance compensation.

Figure 11:
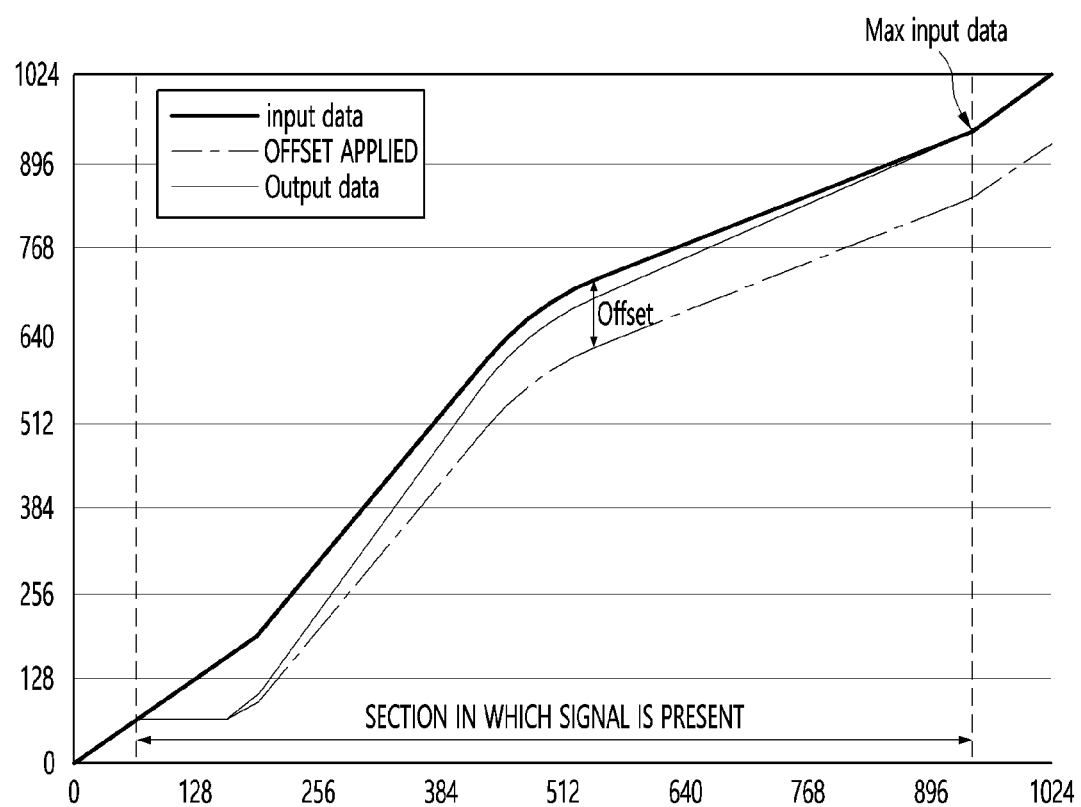
FIG. 11 is an example diagram for explaining a method of correcting an LUT curve by applying an offset gain by a display device according to an embodiment of the present disclosure.

FIG. 11 is an example diagram for explaining a method of correcting an LUT curve by applying an offset gain by a display device according to an embodiment of the present disclosure.

Referring to FIG. 11, "input data" indicates an LUT curve based on RGB data of an input image and "offset applied" indicates an LUT curve when the offset gain is applied.

In some cases, as seen from FIG. 11, luminance may decrease as the offset gain is applied. In particular, max luminance (Max input data) may be dark in a section in which a signal is present, and thus luminance compensation may be performed to compensate for this, and "output data" indicates an LUT curve when luminance compensation is performed. In particular, the controller 170 may perform luminance compensation using the following expression.

$$\text{Output data}=(\text{input data}-\text{offset})*(\text{Max input data})/(\text{Max Input data}-\text{offset}) \quad [\text{Equation 1}]$$

That is, as shown in FIG. 11, when the max luminance decreases when the offset gain is applied, the controller 170 may acquire an LUT curve obtained by compensating for luminance based on the reduced value of the max luminance.

Again, FIG. 6 is described.

The controller 170 may perform tone mapping using the corrected LUT curve (S17).

The controller 170 may perform tone mapping for converting RGB data of an input image according to the corrected LUT curve.

The controller 170 may output an image according to tone mapping (S19).

The controller 170 may control the display 180 to output an image based on the RGB data converted according to tone mapping.

Figure 12B:
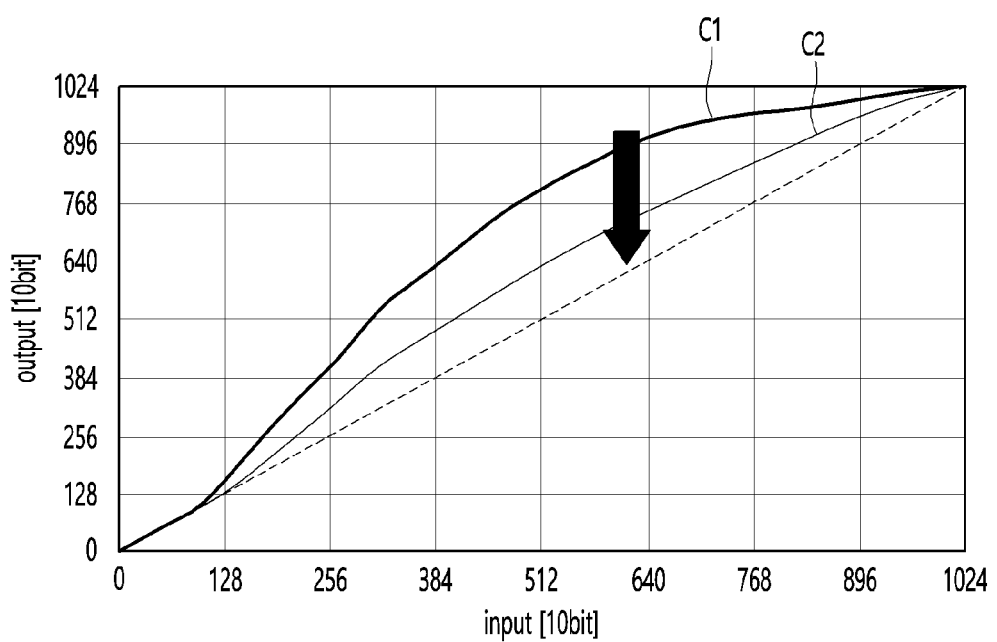

FIGS. 12A and 12B are example diagrams for explaining a method of differently outputting an LUT curve according to a peak of an input image by a display device according to an embodiment of the present disclosure.

In a histogram when an image is input as shown in an upper part of FIG. 12A, the controller 170 may detect data of an image output from the display 180 to acquire an LUT curve, which may be a curve C1 of FIG. 12B. When an image in which data of a bin corresponding to a peak of the histogram shown in the lower part of FIG. 12A is input, the controller 170 may detect data of the image output from the display 180 to acquire an LUT curve, which may be curves C1 and C2 of FIG. 12B. That is, as seen from the curves C1 and C2 shown in FIG. 12B, as data of a bin corresponding to a peak is changed, the LUT curve may be changed.

Figure 13B:
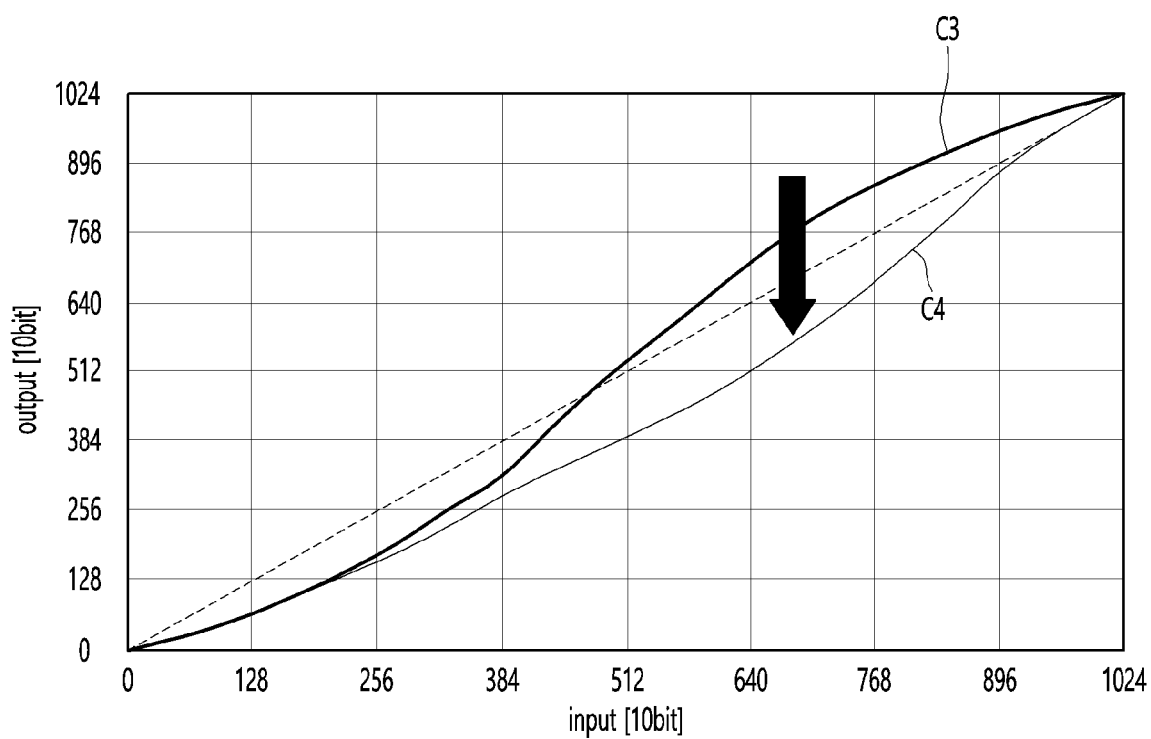

FIGS. 13A and 13B are example diagrams for explaining a method of differently outputting an LUT curve according to distribution of a histogram of an input image by a display device according to an embodiment of the present disclosure.

In a histogram when an image is input as shown in an upper part of FIG. 13A, the controller 170 may detect data of an image output from the display 180 to acquire an LUT curve, which may be a curve C3 of FIG. 13B. When an image in which distribution of the histogram shown in the lower part of FIG. 13A is input, the controller 170 may detect data of the image output from the display 180 to acquire an LUT curve, which may be a curve C4 of FIG. 13B. That is, as seen from the curves C3 and C4 shown in FIG. 13B, as distribution of the histogram is changed, the LUT curve may be changed.

Figure 14A:
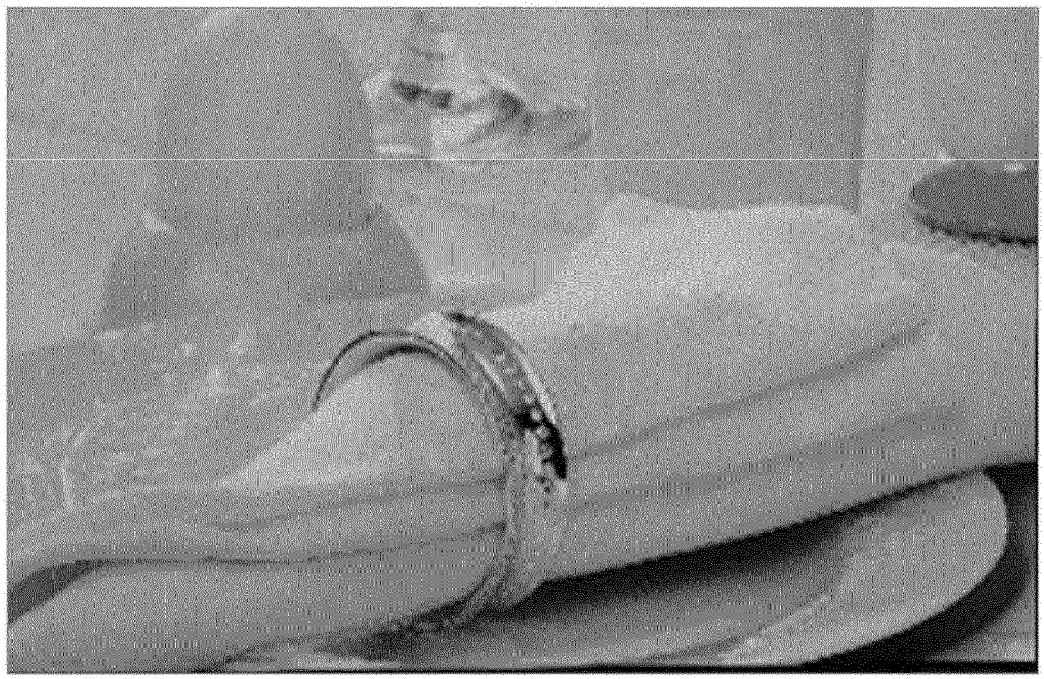
FIG. 14A is an example diagram of an output image based on RGB data of an input image by a display device according to an embodiment of the present disclosure.
Figure 14B:
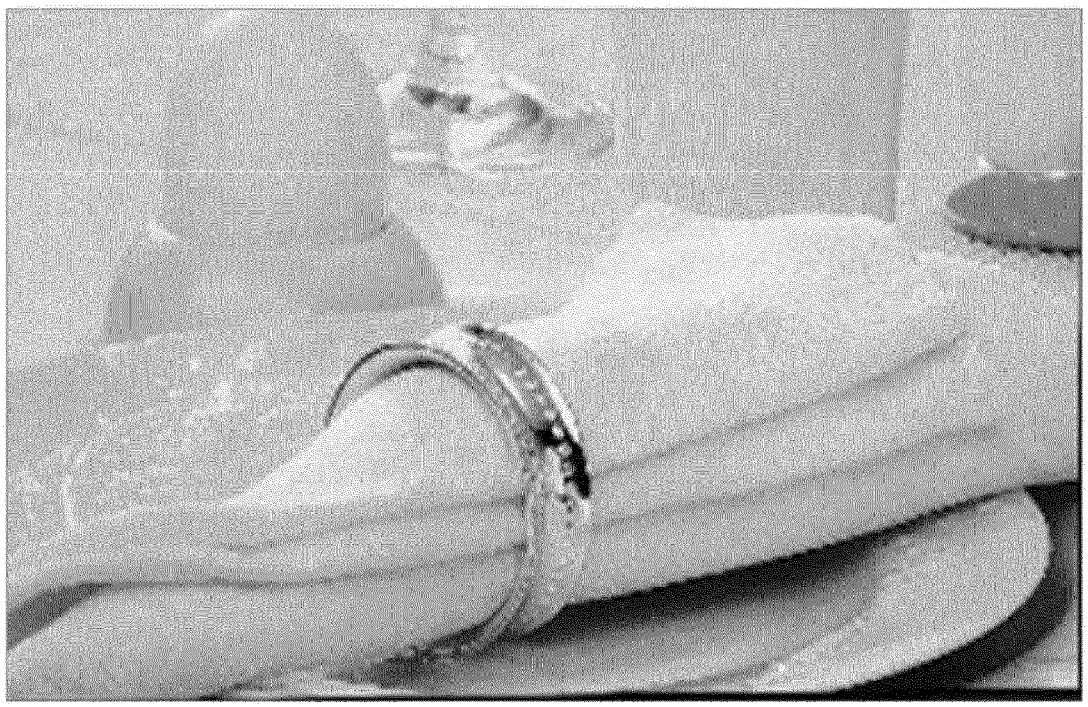
FIG. 14B is an example diagram of an output image when a static curve is applied to RGB data of an input image by a display device according to an embodiment of the present disclosure.
Figure 14C:
FIG. 14C is an example diagram of an output image by performing tone mapping on RGB data of an input image using a corrected LUT curve by a display device according to an embodiment of the present disclosure.

FIG. 14A is an example diagram of an output image based on RGB data of an input image by a display device according to an embodiment of the present disclosure. FIG. 14B is an example diagram of an output image when a static curve is applied to RGB data of an input image by a display device according to an embodiment of the present disclosure. FIG. 14C is an example diagram of an output image by performing tone mapping on RGB data of an input image using a corrected LUT curve by a display device according to an embodiment of the present disclosure.

As seen from FIGS. 14A and 14B, a static curve may be applied irrespective of image information, and thus the image may brighten only and a contrast ratio may decrease. However, as seen from FIGS. 14A and 14C, when any one of a plurality of LUT curves is selected and an LUT curve is corrected based on a histogram, a contrast ratio, expressiveness, three-dimensional effect, etc. may be improved.

That is, according to an embodiment of the present disclosure, an LUT curve is changed based on image information, and thus an image based on an LUT curve optimized for the current scene may be output, and accordingly, a contrast ratio may be maximized, and a subtle differences in color may be greatly expanded, thereby advantageously improving expressiveness.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A display device comprising:
    a display;
    one or more processors; and
    a memory storing one or more programs configured to be executed by the one or more processors, the one or more programs including instructions for:
    receiving an input image to be displayed on the display;
    selecting a look-up table (LUT) curve stored in the memory for the received input image;
    acquiring a histogram from the received input image;
    dividing the histogram into a plurality of bins;
    grouping the plurality of bins into groups, each of the groups including multiple consecutive bins having an amount of data greater than at least a predetermined percentage of a total data occupied by the plurality of bins;
    selecting a first group among the groups;

setting an offset gain based on at least one of a maximum bin having a maximum level of the histogram and a representative bin among the consecutive bins included in the first group;

applying the offset gain to the selected LUT curve based on the histogram to generate an offset LUT curve;

performing tone mapping of the input image through the offset LUT curve to generate a tone mapped image; and displaying the tone mapped image on the display.

2. The display device of claim 1, wherein the representative bin is a first bin in the first group.

3. The display device of claim 1, wherein, when the first group of consecutive bins includes a highest percentage of data compared to other groups, setting the offset gain based on the maximum bin.

4. The display device of claim 1, wherein, when the first group of consecutive bins does not include a highest percentage of data compared to other groups, setting the offset gain based on an average of the maximum bin and the representative bin.

5. The display device of claim 1, wherein levels of the histogram correspond to luminance levels or a frequency for each luminance level.

6. The display device of claim 1, wherein a second group of bins has at least one bin overlapping a bin in the first group.

7. The display device of claim 1, wherein the one or more programs further include instructions for:

when data corresponding to 50% or more in the histogram of the input image belongs to a range corresponding to an upper first setting ratio, applying the offset gain of 0 to the selected LUT curve.

8. The display device of claim 7, wherein the one or more programs further include instructions for:

when data corresponding to a top 50% or more in the histogram of the input image belongs to a range corresponding to an upper second setting ratio, differently setting the offset gain depending on an amount of data belonging to the range corresponding to the upper second setting ratio.

9. The display device of claim 8, wherein the one or more programs further include instructions for:

setting the offset gain by multiplying a gain value mapped to an offset point by a specified constant depending on an amount of data belonging to the range of the upper second setting ratio.

10. The display device of claim 1, wherein the offset LUT curve is obtained by compensating for a luminance based on a reduced value of a max luminance.

11. The display device of claim 1, wherein the LUT curve is selected based on a peak luminance level or an average picture level (APL) of the input image.

12. A method of controlling a display device including a display, the method comprising:

receiving an input image to be displayed on the display;

selecting a look-up table (LUT) curve stored in a memory for the received input image;

acquiring a histogram from the received input image;

dividing the histogram into a plurality of bins;

grouping the plurality of bins into groups, each of the groups including multiple consecutive bins having an amount of data greater than at least a predetermined percentage of a total data occupied by the plurality of bins;

selecting a first group among the groups;

acquiring an offset gain based on at least one of a maximum bin having a maximum level of the histogram and a representative bin among the consecutive bins included in the first group;

applying the offset gain to the selected LUT curve based on the histogram to generate an offset LUT curve;

performing tone mapping of the input image through the offset LUT curve to generate a tone mapped image; and displaying the tone mapped image on the display.

13. A non-transitory computer readable medium storing one or more programs, the one or more programs comprising instructions, which when executed, by a display device having a display, cause the display device to:

receive an input image to be displayed on the display;

select a look-up table (LUT) curve stored in a memory for the received input image;

acquire a histogram from the received input image;

divide the histogram into a plurality of bins;

divide the plurality of bins into groups, each of the groups including multiple consecutive bins having an amount of data greater than at least a predetermined percentage of a total data occupied by the plurality of bins;

select a first group among the divided groups;

acquire an offset gain based on at least one of a maximum bin having a maximum level of the histogram and a representative bin among the consecutive bins included in the first group;

apply the offset gain to the selected LUT curve based on the histogram to generate an offset LUT curve;

perform tone mapping of the input image through the offset LUT curve to generate a tone mapped image; and display the tone mapped image on the display.

* * * * *